Jan. 16, 1968     W. A. KEITZER     3,363,619
VOIDING AUDIOGRAPH AND METHOD OF USING SAME
Filed March 29, 1965     6 Sheets-Sheet 1

INVENTOR.
WALTER A. KEITZER
BY Gordon C. Mack
ATTORNEY

Jan. 16, 1968  W. A. KEITZER  3,363,619
VOIDING AUDIOGRAPH AND METHOD OF USING SAME
Filed March 29, 1965  6 Sheets-Sheet 2

INVENTOR
WALTER A. KEITZER
BY *Gordon C. Mack*
ATTORNEY

United States Patent Office 3,363,619
Patented Jan. 16, 1968

3,363,619
VOIDING AUDIOGRAPH AND METHOD OF USING SAME
Walter A. Keitzer, 3371 W. Bath Road,
Akron, Ohio 44313
Filed Mar. 29, 1965, Ser. No. 443,286
5 Claims. (Cl. 128—2)

ABSTRACT OF THE DISCLOSURE

The force of the urinary stream in the atmosphere consists of two components: Q, the flow rate and V, the velocity. They are equally important in determining the patient's ability to void and are easily measured by recording the sound made by voiding into a receptacle. A patient's condition is determined by analyzing the sound, and comparing audiograms made at different times to evaluate the effect of any particular treatment and to study the changes in the patient's condition.

This invention relates to a voiding audiograph, a voiding audiogram, and the method of operating the audiograph to produce the audiogram. The application refers more particularly to making an ink audiogram, but it might be made in other ways, as by a light on light-sensitive paper, etc.

The voiding audiograph is a means of recording as a graph the sound made by voiding urine. The audiogram recording is a permanent record and preferably includes a plurality of recordings of the sound made by the voiding of the same person at different times, the object being to assess and compare the physiologic changes of that person's bladder due to obstruction and its removal.

It has been found that the force of the urinary stream is directly proportional to two equally important variables, viz. (1) the volumetric flow rate and (2) the velocity of the fluid (i.e. the flow pressure). Moreover, the force of the urinary stream is directly proportional to the voiding pressure of the bladder. From a study of the audiograms, we can determine the degree of obstruction, if any, of the lower urinary tract.

The same laws of hydrodynamics apply to the urinary stream as to other fluids. Fluid flow is based upon the general energy equation and from Newton's laws of motion. In the voiding audiograms, the energy is represented as sound intensity or decibels which are plotted along the V axis herein, and the time of voiding is plotted along the X axis. There are three basic equations that may be applied alone or in combination to assist in the study of voiding. They are Bernoulli's, the Continuity, and the Momentum equations. We shall refer to FIGURE 4, which represents a hydraulic "system," the urethra, which is between section 1 and section 2. Section 1 is the entrance into the urethra at the bladder neck and is the area $A_1$ or diameter $D_1$. Section 2 is the exit of the urethra called the meatus and has the area $A_2$ or diameter $D_2$. The diameter D is the average diameter of the urethra. $P_1$ is the voiding pressure in the bladder applied to area $A_1$. $P_2$ is the atmospheric pressure applied to the area of the meatus $A_2$. W is the weight of urine in the urethra in grams. $R_y$ is the resistance in the urethra to the flow of urine, or the net resultant forces of the urethral walls acting upon the urine flowing through it. $V_1$ is the velocity of the urine in the bladder and is considered as zero; whereas $V_2$ is the velocity as the urine leaves the meatus of the urethra. Sections 1 and 2 apply to all three equations.

Figures 1, 2, 3, 4:
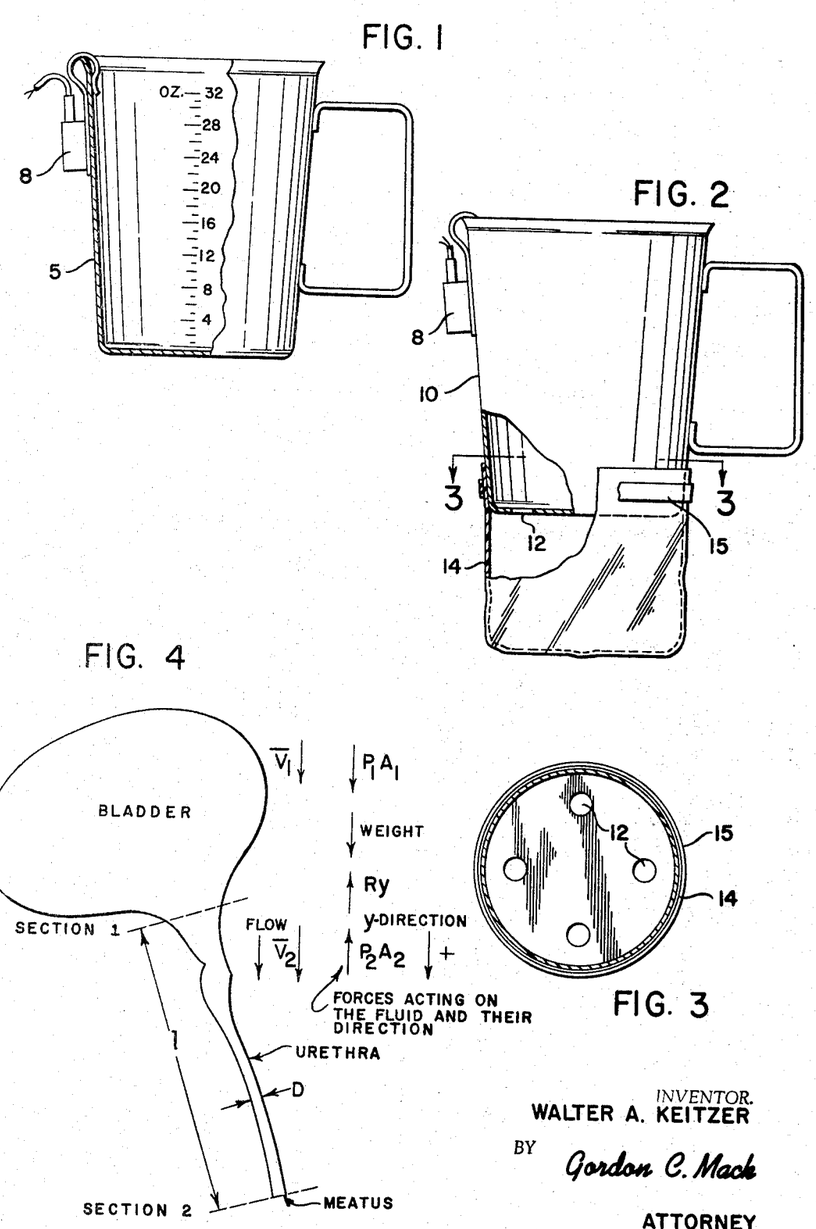
FIGURE 1 is an elevation, partly broken away, of a graduated, tight metal container, with a microphone attached.
FIGURE 2 is an elevation of a container with a perforated bottom and plastic bag attached over the bottom, partly broken away, with a microphone attached.
FIGURE 3 is a section on the line 3—3 of FIGURE 2.
FIGURE 4 is a diagrammatic view of a bladder and urethra, with markings and a legend which will be explained.

Bernoulli's equation is a simplification of the law of conservation of energy. The energy that goes into the urethra must equal the energy that comes out.

$$Z_1 + P_1 + \frac{V_1^2}{2g} = Z_2 + P_2 + \frac{V_2^2}{2g} + H_L$$

The symbol Z is the potential energy of position (elevation). P is the voiding pressure. $P_1$ is the pressure within the bladder and is the potential energy of the contraction of the bladder muscles, plus the weight of the abdominal organs. $V^2/2g$ is the kinetic energy of flow (flow pressure) and represents the actual work performed. Each symbol in this equation represents the amount of energy in gram-centimeters per gram of fluid and therefore by cancelling the grams (gm.cm./gm.) we have a linear quantity called a "head" which can be measured in vertical centimeters. Therefore we have an elevation head, a pressure head and a velocity head all measured in centimeters. $H_L$ is the head loss due to friction (resistance) of the urethra to the flow of urine and it must be added to the right side of the equation to make the energy balance.

In the bladder during voiding there is no velocity and the kinetic energy of flow $V_1^2/2g$ is zero; while in the urinary stream in the atmosphere there is no static pressure and the elevation at the meatus urinarius is considered zero, $Z_2$ and $P_2$ are zero. Thus, the equation for voiding may be simplified:

$$Z_1 + P_1 - H_L = \frac{V_2^2}{2g}$$

This means that the total head of pressure in the bladder while voiding $(Z_1+P_1)$ minus the head loss due to the resistance of the urethra $(H_L)$ equals the velocity head of the urinary stream. This velocity head is kinetic energy and therefore able to produce work. By converting this velocity head into sound energy, then rectifying the audio voltage, we obtain a graphic curve of how the patient voids.

The Continuity equation is used in steady fluid flow. The volumetric flow rate (Q) is equal to the velocity times the area:

$$Q = V_1 A_1 = V_2 A_2$$

where Q is the flow rate, $A_1$ is the area of the bladder neck and $A_2$ is the area at the meatus of the urethra, and $V_1$ and $V_2$ are the velocity at the bladder neck and the meatus. For a given Q the V varies inversely with the area. With circular tubes, A varies as the square of the diameter D. Therefore V will vary as $D^2$ and the velocity head, $V^2/2g$, will vary inversely as the 4th power of the diameter D. From this, it can be seen that for a given flow rate, as the diameter of the meatus decreases there will be a marked increase of the velocity head. This is commonly seen in children with stricture of the meatus where the force of the stream and the cast distance is markedly increased. Due to the elasticity of the urethra, the diameter measured with the bougie á boules is not the same as that of the urinary stream, which latter we have found averages only 12F (4 mm.). However, this increased velocity head shows very nicely in the graphic voiding curve. Normally, one-third of the energy is lost by conversion to heat (heat loss) due to resistance of the urethra; and the other two-thirds is converted to kinetic energy of the velocity head of the urinary stream. Since the normal voiding pressure varies between 25 and 75 cm. of water pressure, then the velocity head would vary between 15 and 50 cm. of pressure.

The Momentum equation has to do with Force, which is a vector quantity, similar to velocity and acceleration, having direction as well as magnitude. When applied to voiding, the equation states:

$$P_1 A_1 + W - R_y - P_2 A_2 = pQ(V_2 - V_1)$$

See FIGURE 4. On the left side of the equation are the forces acting in the urethra and on the right side are the forces acting on the urinary stream in the atmosphere. $P_1$ is the voiding pressure acting over the area of the bladder neck $A_1$; W is the weight of the urine in the urethra; $R_y$ is the resistance or net resultant force of the urethral walls acting upon the urine flowing through it; and $P_2$ is the atmospheric pressure acting at the area of the meatus $A_2$ against the flow of urine. The force in the urinary stream consists of $p$ the density of the urine; Q the flow rate in cc./sec.; $V_2$ is the velocity of the urinary stream in cm./sec. while $V_1$ is the velocity at entrance of urethra at the bladder neck and may be considered as zero.

Using this equation, we set up an experimental model of the male and female urethra, assigning various diameters to the bladder neck, external sphincter, and urethral meatus; and various voiding pressures and flow rates. These findings were than programmed with Fortran II and run through an electronic computer. Perhaps one of the more important findings from this study is that when the diameter of the bladder neck was smaller than the diameter of the external sphincter and urethral meatus, instead of a positive resistance against the flow of urine, on the contrary, a negative resistance occurred, increasing the force of the flow of urine. This could account for stress incontinence of urine in the female, where it is not unusual for the bladder neck to measure a smaller diameter than the rest of the urethra.

A second important application of the Momentum equation concerns the force of the urinary stream. Since it is in the atmosphere, it acts similar to a jet:

$$F = pQV$$

Since the density is fixed, then the two variables, velocity and flow rate are inversely proportional to each other and must be considered together. Therefore it is impossible to accurately determine the degree of obstruction by using the flow rate alone. The graphic voiding audiogram combines these two variables so that the degree of obstruction may be determined.

Furthermore, as can be seen from the Momentum equation, the area of the bladder neck and meatus are fixed quantities as is the resistance of the urethra to voiding. Consequently, the force of the urinary stream is directly proportional to the voiding pressure ($P_1$) in the bladder. This can easily be demonstrated while voiding, by increasing the voiding pressure with the abdominal muscles and diaphragm (straining). This direct relationship with the voiding pressure in the bladder holds true for the normal individual as well as those with early obstruction having a compensated bladder. This relationship is lost in those with a decompensated bladder. These conditions are well shown with the voiding audiogram.

The application of the laws of hydrodynamics to voiding is somewhat limited, due to the physiologic changes from obstruction, and the inability to accurately measure the diameters of the urethra. That leaves only two choices; one must either use the method of Von Garellts and insert a catheter into the bladder to measure the voiding pressure simultaneously with the flow rate, or convert the force of the urinary stream into a graphic voiding curve according to this invention. The latter is done with a voiding audiograph and the graph is called the voiding audiogram.

The advantages of the voiding audiograph method of determining voiding ability are:

(1) Its universal application to all patients except those that cannot cooperate.

(2) It is rapid. The entire procedure, including the production of the audiogram, can be completed in less than five minutes.

(3) The entire procedure can be handled by a nurse or technician, thereby saving the doctor's time.

(4) No special room is necessary since the equipment is portable.

(5) The only mathematics involved is in obtaining the flow rate by dividing the seconds duration of the voiding sound into the volume.

(6) The equipment is relatively cheap compared to expensive amplifiers and strain gauges which have been suggested for use in the study of voiding. Other than the converter-control unit and the graph paper, the equipment is standard.

(7) There are no electrical hazards to the patient since the tape recorder is battery operated.

(8) The graphic record is made a part of the patient's record and is easily available for subsequent comparison for treatment.

From the diagnostic and treatment standpoint, the voiding audiograph method has several advantages, including new findings, not obtainable by other methods if one understands the physiology of voiding. In the normal individual, voiding consists of automatic contraction of the smooth muscles of the bladder, under a voiding pressure from 25 to 75 cm. of water pressure. This is a reflex action from the spinal cord but can be interrupted by the higher centers of the brain. Whenever obstruction (increased resistance) in the urethra occurs due to a decreased diameter or an enlarged prostate gland, then the bladder muscles must push harder to empty the bladder. This results in a higher voiding pressure but more important the muscles become stronger so that the flow rate is kept near normal. This is called a compensated bladder. When the muscles become too fatigued or overstretched due to increased resistance or infection, then the muscles begin to fail similar to the heart muscles. This is called a decompensating bladder. Here the voiding pressures may go from relative high to low and yet the bladder will empty. Or they may use the abdominal muscles and diaphragm to increase the pressure in the failing bladder. Finally when the bladder has completely failed and can no longer empty itself in spite of using the abdominal muscles, then it is a decompensated bladder carrying a residual urine. Since the treatment depends upon knowing the degree of obstruction and since the voiding audiogram is the only method that will define the degree of obstruction, then it has many advantages from the diagnostic and treatment standpoint:

(1) The volumetric flow rate and the velocity head are both quickly obtained from the same voiding audiogram.

(2) The shape and size of the curve alone help to differentiate normal voiding from voiding with a compensated bladder, a decompensating bladder and a decompensated bladder, etc.

(4) By combining the flow rate, the height of the velocity head and the shape and size of the curve, it is found that:

(a) The normal voiding curve is small, somewhat rectangular in shape with a normal velocity head and an average flow rate of 23 cc. per second but may vary from 17 cc. to 50 cc. second. Of eight hundred thirty five voiding audiograms, one hundred sixty were called normal. The line is relatively smooth, indicating relative freedom from turbulence.

(b) The curve for the compensated bladder with early obstruction is high peaked, due to high voiding pressures, and flow rates from a normal of about 23 cc. per second but may vary from 30 to 17 cc. per second. The base of the curve may be only slightly wider than that for a normal curve. The curve of the line is fairly smooth.

(c) The curve for the decompensating bladder shows as an equilateral type of curve with a velocity head that may vary from elevated to low and is usually irregular in shape rather than smooth. The flow rate varies from 17 cc. to 10 cc. per second. There is usually no residual urine present but may be up to 60 cc. There were three hundred forty-five patients so classified from the audiograms which was 40 percent of the adults and of the children. This is an important finding since this group has usually been called compensated because they did not carry a residual urine.

(d) The curve for the decompensated bladder has a prolonged irregular shape with a velocity head from normal to low. The flow rate varies from 10 cc. per second and approaches zero. The flow of urine is interrupted several times due to the necessity to breath while using the abdominal muscles to void. Residual urine is always present, usually more than 60 cc. There were two hundred seven patients with decompensated bladders, 30 percent of the adults and 9 percent of the children.

(4) The voiding audiograph is excellent for studying the effect of drugs upon the bladder, such as urecholine and probanthine.

The disadvantages of using a simple tape recording of the voiding are:

(1) A simple tape recording of voiding provides sound that will only differentiate between a smooth voiding and the interrupted voiding. It will not define the normal from the compensated bladder or the decompensated bladder without a residual urine from those with a residual urine.

(2) It would be impossible in a large practice of urology to compare the tape recording made a month or so apart on any patient without an elaborate system of recovery of the tape recording. Since it is not unusual to make three to six audio voidings on a single patient the time involved in recovery would be insurmountable.

According to this invention, the audiogram records variations in the intensity of the sound of the urine being collected in a container. If the container is provided with a constant drain (holes in bottom or sides) then the curve of the velocity head of the stream will be similar to the rectangular curve of the voiding pressure, except in the decompensated bladders where it will be somewhat irregular. However, clinically, because of the ease, simplicity and rapidity of using a measuring graduate without holes in the bottom, this will usually be employed and the sound intensity will vary with the resonance. The sound will tend to resonate (peak) between 50 and 100 cc. of urine volume during the first 5 seconds of voiding. This depends upon the flow rate and the velocity of the stream. In the normal individual where the velocity is low, but the flow rate is 23 cc. per second, there may be little or no peaking giving a rectangular curve. But in the high velocity the peak will be very high with a rapid fall off if the flow rate is normal such as with the compensated bladder. As the velocity and flow rate decrease the peak occurs after 5 seconds' time and decreases more slowly producing the equilateral triangle of the decompensating bladder.

The other physical fact is dampening due to two causes:

(1) The volume of fluid fills an ordinary graduate 2 cm. for each 150 cc. of urine thereby decreasing the distance from the meatus of the urethra (normally 12 to 14 cm. distance) and this is equivalent to decreasing the velocity head by that many centimeters.

(2) The dampening effect due to sound as the graduate fills with urine.

There is no need for any correction factor because of these physical factors, but rather they are an advantage in determining the degree of obstruction.

We have used the graduate with constant drain for experimental purposes. We are in the process of devising a method that would easily adapt itself for routine clinical purposes.

The invention is further described in connection with the accompanying drawings, in which:

FIGURE 1 shows a tight, graduated container 5, with a small dynamic microphone 8 clipped over its edge. The container is made of metal or other resonant material.

FIGURES 2 and 3 show a container 10 and microphone 8, but there are several openings 12 in the bottom of the container, and the plastic bag 14 is held by the clamp 15 to collect the urine which drains from the container.

In using a container such as that shown in FIGURES 2 and 3, no correction in the curve obtained is required. The use of a tight container such as that shown in FIGURE 1, has already been discussed.

Figure 7:
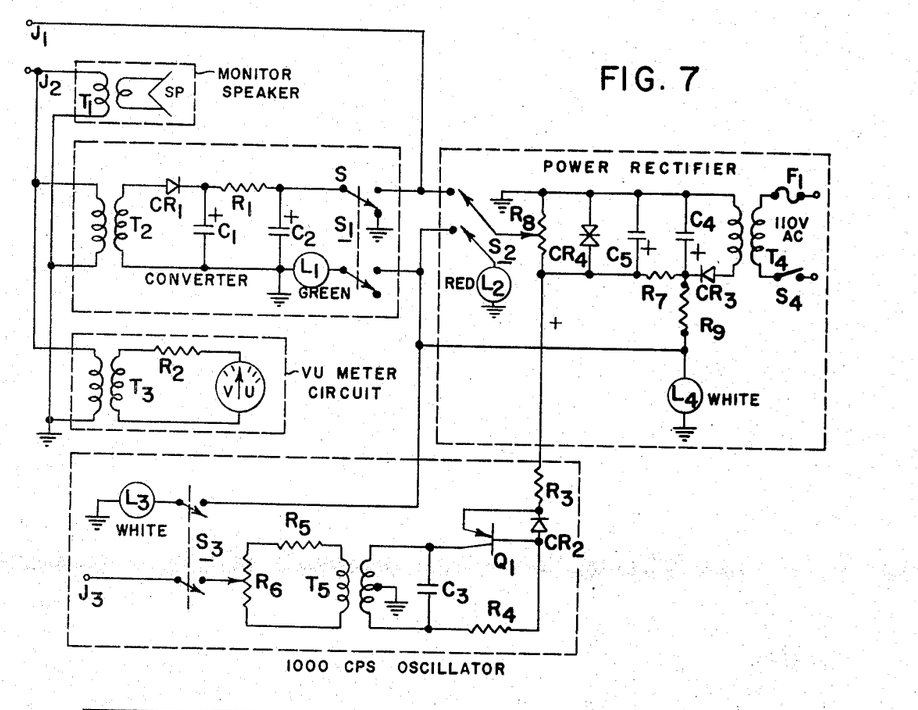
FIGURE 7 is a wiring diagram of the equipment shown in FIGURE 6.
Figure 8:
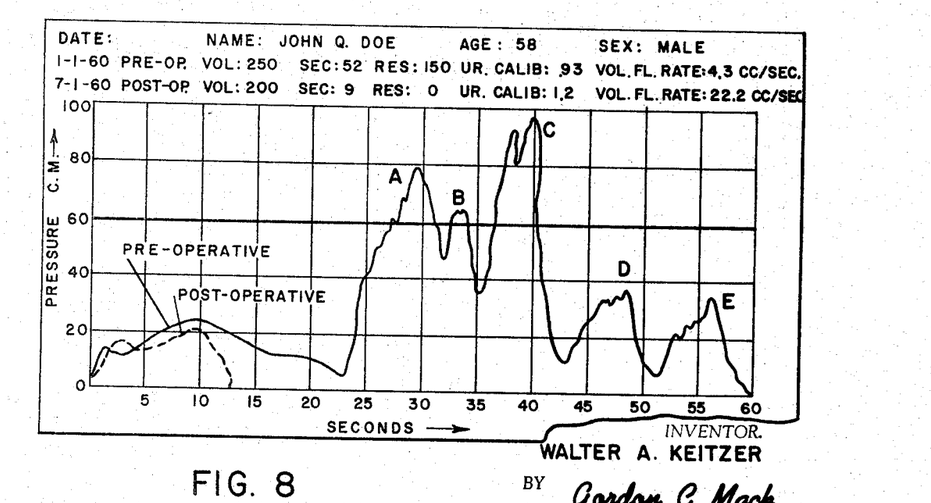
FIGURE 8 is an audiogram showing pre-operative and post-operative voiding curves made by the same person.
Figure 10:
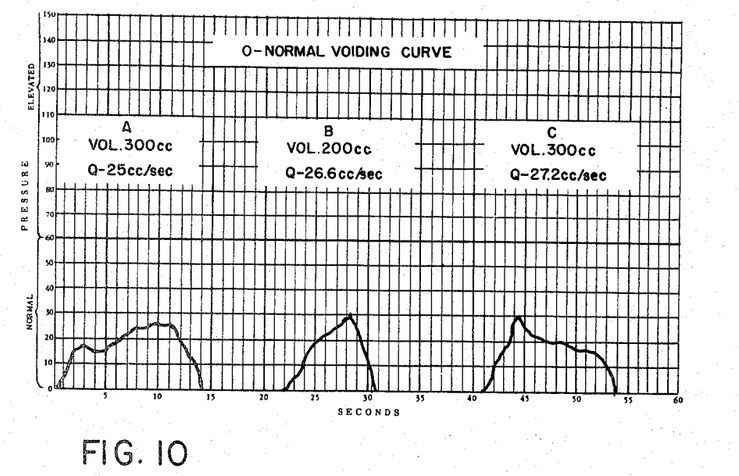
FIGURE 10 shows three normal voiding curves. Each is somewhat small, smooth and rectangular. The velocity head is within normal limits, i.e., under 50 cm. of water pressure. The flow rate will average 23 cc. per sec. but may vary from 17 cc. to 45 cc. per sec.
Figure 11:
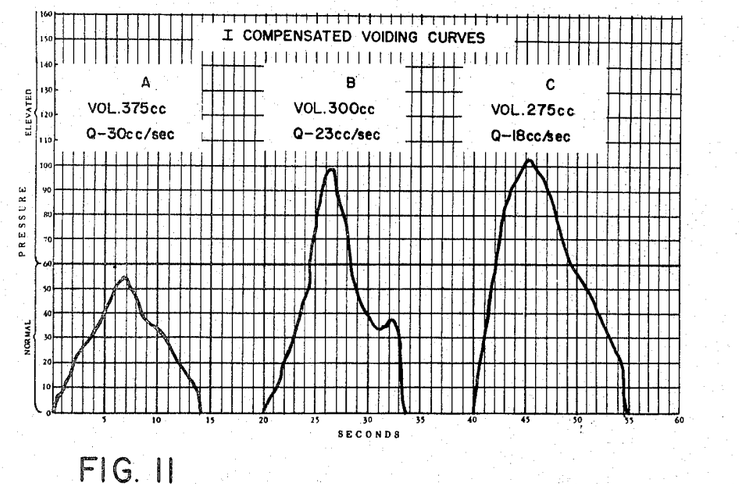
FIGURE 11 shows three voiding patterns of patients with compensated bladder, the result of early obstruction to voiding. Since the bladder muscles become hypertrophied (stronger) the voiding pressure will be increased and consequently the velocity head of the urinary stream. This shows as a high peaked smooth curve with a normal flow rate.
Figure 12:
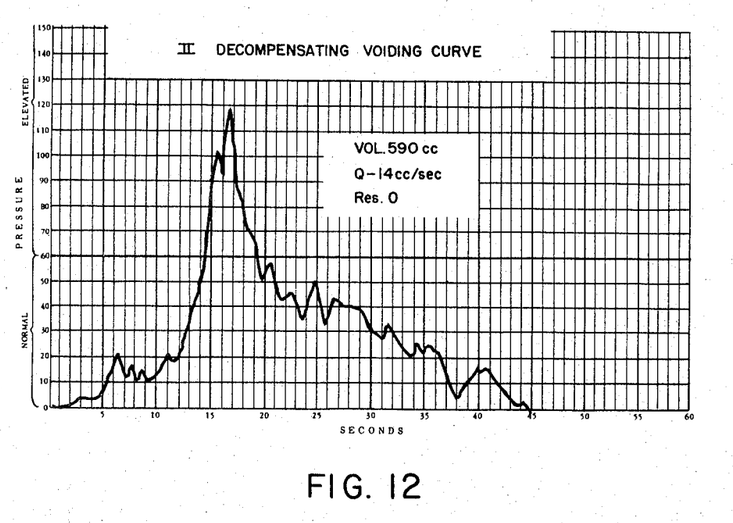
FIGURE 12 shows the voiding pattern of the decompensating bladder where the bladder muscles cannot empty the bladder alone but call on the abdominal muscles and diaphragm to help. This results in a somewhat triangular curve, usually irregular due to use of the abdominal muscles but with a flow rate varying from 10 to 17 cc. per second. The velocity head is from normal to elevated. There is usually no residual urine in this group but may be as high as 60 cc. with large volumes of urine.
Figure 13:
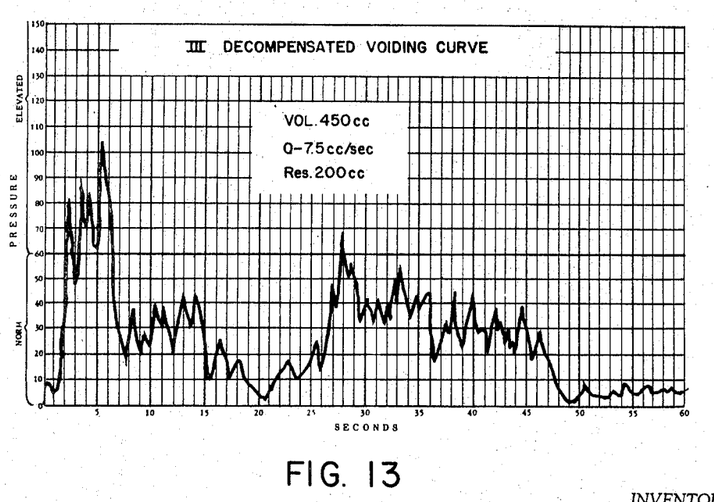
FIGURE 13 is the characteristic voiding audiogram of a decompensated bladder. The curve is irregular, prolonged with a normal to low velocity head and a flow rate that varies from 10 cc. to zero (retention of the urine). The bladder muscles are in total failure but even with the abdominal muscles the patient is unable to empty the bladder of urine. The residual urine varies from 60 cc. to retention of urine.
Figure 14:
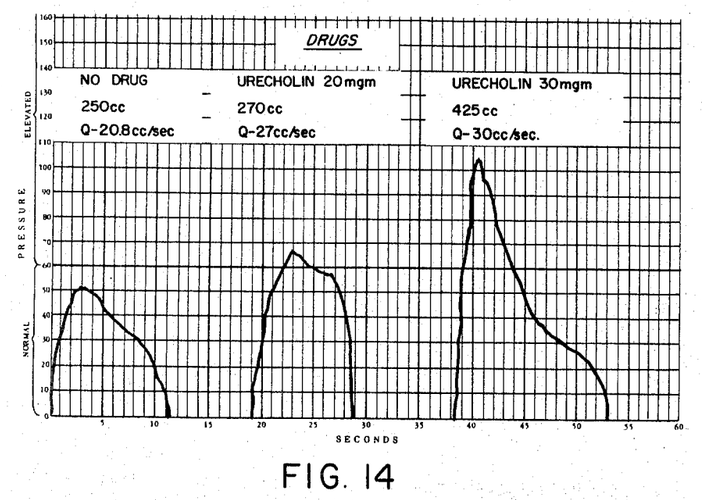
FIGURE 14 illustrates very nicely the effect of stimulating the bladder muscles with drugs. This compares a normal voiding pattern with various doses of urecholine. Not only does the velocity head become markedly increased but also the flow rate.
Figure 15:
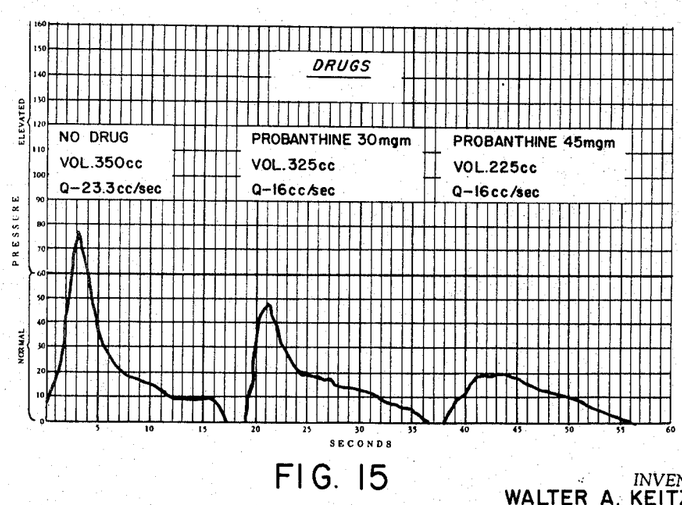
FIGURE 15 shows the effect of smooth muscle relaxing drugs upon the voiding pattern. This shows a normal voiding pattern and then the effect of increasing doses of probanthine. Not only does the flow rate drop but also the velocity head of the urinary stream.

Various refinements may be made in the equipment used. Ordinarily, it will be most convenient to produce a tape and then produce the audiogram from this, but the audiogram may be produced directly. In the latter case, the microphone may replace the tape recorder, as shown in FIGURE 7 so that the audiogram is produced directly.

Figures 5, 9:
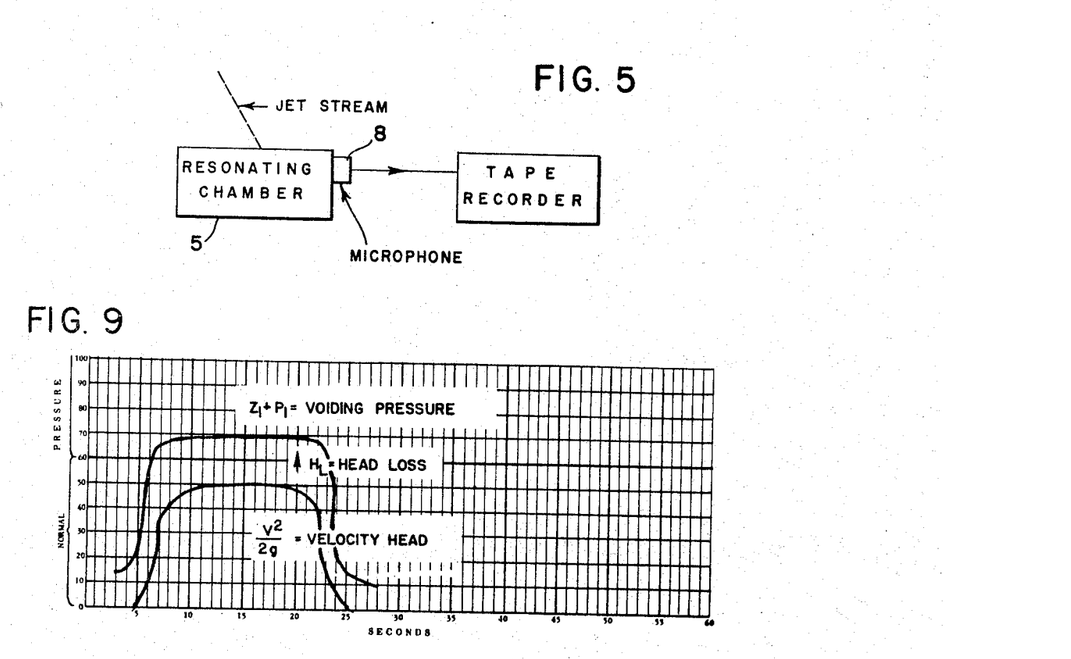
FIGURE 5 is a flow diagram showing the equipment required for making a tape.
FIGURE 9 shows a curve of voiding pressure and an audiogram taken simultaneously.
Figure 6:
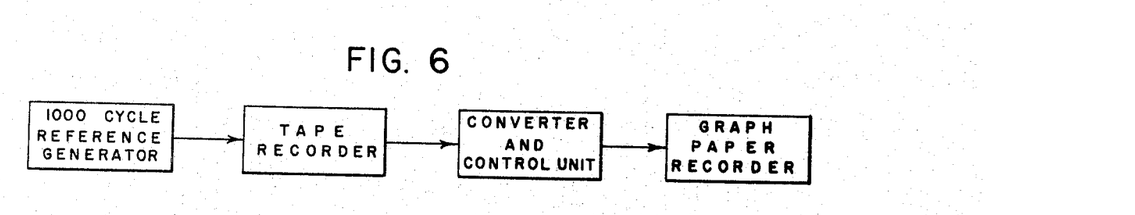
FIGURE 6 is a flow diagram showing the equipment required for making a voiding audiogram from a tape.

It may be desirable to simultaneously measure the voiding pressure in the bladder with a small suprapubic catheter and strain gauge and at the same time make an audiogram using the microphone, with a small amplifier, to rectifier, to the graphic recorder. This makes dual recording with the curve of the voiding pressure and the curve of the audiogram beneath, as illustrated in FIGURE 9. This is similar to the method of Von Garrelts except that the velocity head and the flow rate are obtained simultaneously and shown together.

The tape recorder is advantageously battery operated because a circuit-operated device might injure the patient by his being short-circuited through the urine stream. A battery of constant voltage is desirable. It is preferably light in weight so that a recorder equipped with it can be carried easily from one examining room to another. This arrangement is preferable to connecting the microphone which is on the container directly to a converter and control unit, etc., in a stationary installation. The tone control is adjusted to emphasize the high tones and attenuate the unwanted low frequencies. The volume control is fixed for operating at all times at the same level for audio recording, as explained below where calibration is discussed.

Many different arrangements of electrical equipment can be used to accomplish the desired result. In order to facilitate an understanding of the operation of the arrangement illustrated in FIGURE 7, different elements which might be used are here briefly described.

| Symbol: | Description of element |
|---|---|
| $T_1$ | Speaker transformer. |
| $T_2$ | Audio transformer: 3.2/10 kiloohms. |
| $T_3$ | Audio transformer: 3.2/500 ohms. |
| $T_4$ | Transformer: 110 v., 6.3 v. AC. |
| $T_5$ | Audio transformer: 3.2/500 ohms. |
| $CR_1$ | Diode; half-wave rectifier: IN 60. |
| $CR_2$ | Diode: IN 60. |
| $CR_3$ | Diode. |
| $CR_4$ | Zener diode: 6.3 volts. |
| $R_1$ | Resistor: 3.3 kiloohms. |
| $R_2$ | Resistor: 100 ohms. |
| $R_3$ | Resistor: 220 ohms. |
| $R_4$ | Resistor: 1000 ohms. |
| $R_5$ | Resistor: 470 kiloohms. |
| $R_6$ | Variable resistor. |
| $R_7$ | Resistor: 220 ohms. |
| $R_8$ | Variable resistor: 11 kiloohms. |
| $R_9$ | Resistor: 6 ohms. |
| $C_1$ | Capacitor. |
| $C_2$ | Capacitor 2 mfd. |
| $C_3$ | Capacitor: .01 mfd. |
| $C_4$ | Capacitor: 150 mfd. |
| $L_1$ | Green pilot light. |
| $L_2$ | Red pilot light. |
| $L_3$ | White pilot light. |
| $L_4$ | White pilot light. |
| $Q_1$ | Transistor: PNP-type. |
| $F_1$ | Fuse: 1 amp. 3AG. |
| $J_1, J_2, J_3$ | Input/output jacks. |
| $S_1, S_2, S_3$ | Double pole, single throw switches. |
| $S_4$ | Single pole, single throw switch. |

The graphic recorder is advantageously one which is operated on about 100 millivolts. It is a full graph recorder. Although means for visual recording on any means may be provided, that shown is for producing an ink record on paper. A single graph paper is used and several audiograms can be made on the same paper (preferably with differently colored inks) from time to time, to show the patient's progress (or other change in his condition). The paper used is provided with spaces for filling in the pre-operation and post-operation dates, volumes voided, the times of voiding and the volume flow rates, and perhaps other data.

The base of the audiogram shown in FIGURE 9 is divided to represent the passage of 60 seconds. The Y axis is marked to show sound intensity which is a measure of the sound energy or pressure. The pressures are only relative and are for clinical purposes only. The recorder includes a position adjustment and an attenuator (level) control.

CALIBRATION

There are several methods of calibration; however, the electronic method is basic due to the fact that 1000 cycles is a fundamental frequency of normal voiding, and this is here used as a reference. As the force of voiding increases so does the noise volume producing a higher voltage. This method of calibration is the only one described here.

A. Audio voiding

To make a magnetic tape recording of the patient voiding, he is placed in a room by himself, told to hold the graduate by the handle, and to direct the stream toward the bottom. With the microphone attached to the handle of the graduate, the tape recorder is turned on (recording) by the doctor or nurse and is turned off at the completion of voiding by the patent or parent, if a child. The minimum volume is 150 cc. for adults, 100 cc. for children and maximum volume is 500 cc. Patient is then catheterized for residual. The tape recorder and graduate are then taken to the laboratory. The volume of urine in the graduate is noted and using the microphone (recording) identification is made of the name, date, age, sex and volume of urine. We also keep a log of each roll of magnetic tape so that if needed we can always locate the audio voiding at a later date and for statistical purposes.

B. The audiogram

To make the graphic recording of the audio voiding from the magnetic tape the following procedure is used:

(1) The control unit and the graphic recorder are kept in the laboratory as a fixed installation. It is assumed that they are both plugged into the power line and in addition, the power switch and motor switch of the graphic recorder are in the ON position. Both of these units should have warmed up for at least 10 minutes before using.

(2) The tape recorder is placed close to the above unit. A phone cable is connected from the *remote* speaker jack of the *tape* recorder to the *input* jack of the *control* unit. A phone cable is run from the *output* jack of the control unit to the *input* posts of the graphic recorder (this is a permanent connection.)

(3) With all of the switches in the OFF position of the control unit, the audio tape is run back to the beginning of the sound from the voiding that you wish to make a graphic curve. The test voltage on the control unit (white pilot) is switched on; then the ground switch of control unit (green pilot) is switched on thereby closing the circuit with the graphic recorder. This should cause the writing pen of the graphic recorder to move vertically to 60 cm. mark, demonstrating that there has been no change in the fixed parameters and all in readiness for making the graph. The test voltage (white pilot) is turned off.

(4) Simultaneously, the tape recorder and the time switch of the graphic recorder are turned on. This will trace the voiding curve. At the completion of the sound or curve from the voiding, the ground switch is turned off (green pilot) and also the time switch. One or more seconds must be subtracted from the duration of the voiding as noted on the graph. This is to allow for the discharge of the condenser (time constant) and the pen drag. This can be checked by a stop watch several times to determine the cut-off point of the voiding.

C. Calibration of audiograph

Calibration can be done by several methods:

(1) *Electronic method.*—This consists of connecting a phone cable from the sine wave oscillator jack from the rear of the control unit to the microphone input of the tape recorder. The switch on the right front panel (red pilot) is turned on. A 10-second recording is made on the tape. This is played back exactly as directed above in making a graphic voiding curve. This 1000 cycle tone will give a response on both the decibel meter and the graphic recorder. By adjusting the volume control and repeating the tape test one should be able to make the tone record zero decibels. The volume control on the tape recorder is fixed at this point. The tone control is also fixed for highest frequencies (treble). The sine wave switch (red pilot) is turned off.

Playing this sine wave recording (zero decibels) the volume control on the graphic recorder is adjusted so the line will trace at the heavy 60 cm. line. The volume control of graphic recorder is then fixed.

Zero adjustment on the graphic recorder is self-explanatory.

Test voltage is now adjusted by means of screwdriver on left front panel of control unit. With this on (white pilot) it should be adjusted to the 60 cm. line. This is used to test the graphic recorder to make sure it has not been changed, before transcribing each time.

The invention is covered in the claims which follow.

What I claim is:

1. The method of making a voiding audiogram, which method comprises voiding into a resonant container, converting the resulting sound into a recordable graph in which time is used as one axis and variations in the intensity of the sound made by the voiding stream is used as the other axis, and recording said graph.

2. The method of claim 1 in which two recordable graphs are produced and in recording the same they are reproduced, using the same distances along the respective axes for the same intervals of time and the same sound intensity.

3. The method of making a voiding diagram from a tape recording of the sound of a voiding in which variations in the intensities of sounds made during a single voiding are consecutively recorded, which method comprises converting the tape recording to a graph in which time is used as one axis and variations in sound intensities made by the voiding stream as recorded on the tape are used as the other axis.

4. The method of claim 3 in which two recordable graphs are produced and in recording the same they are reproduced using the same intervals of time in recording along one axis, and the same units of sound intensity for recording along the other axis.

5. A voiding audiograph which comprises a resonant receiver with a microphone attached thereto, a tape recorder which is attachable to the microphone and also a converter attachable to the recorder for converting the fluctuations of sound as recorded on the tape of the recorder to the same unit of sound intensity, and a graphic recorder attached to the converter.

References Cited

UNITED STATES PATENTS

| | | | |
|---|---|---|---|
| 1,290,388 | 1/1919 | Smith | 283—1 |
| 1,419,831 | 6/1922 | Eckes | 283—1 |
| 1,712,848 | 5/1929 | Rose | 128—2 |
| 2,563,384 | 7/1951 | Von Bekesy | 128—2 X |
| 2,626,385 | 1/1953 | Schumann | 128—2 X |
| 2,947,091 | 7/1960 | McCrary | 35—17 |
| 3,236,240 | 2/1966 | Bradley | 128—421 |
| 2,859,956 | 6/1958 | Meriam | 177—4 |
| 3,228,444 | 1/1966 | Weber et al. | 150—3 |

RICHARD A. GAUDET, *Primary Examiner.*

SIMON BRODER, *Examiner.*